(No Model.)
O. SCHMIEDEL.
BICYCLE.
No. 502,866. Patented Aug. 8, 1893.
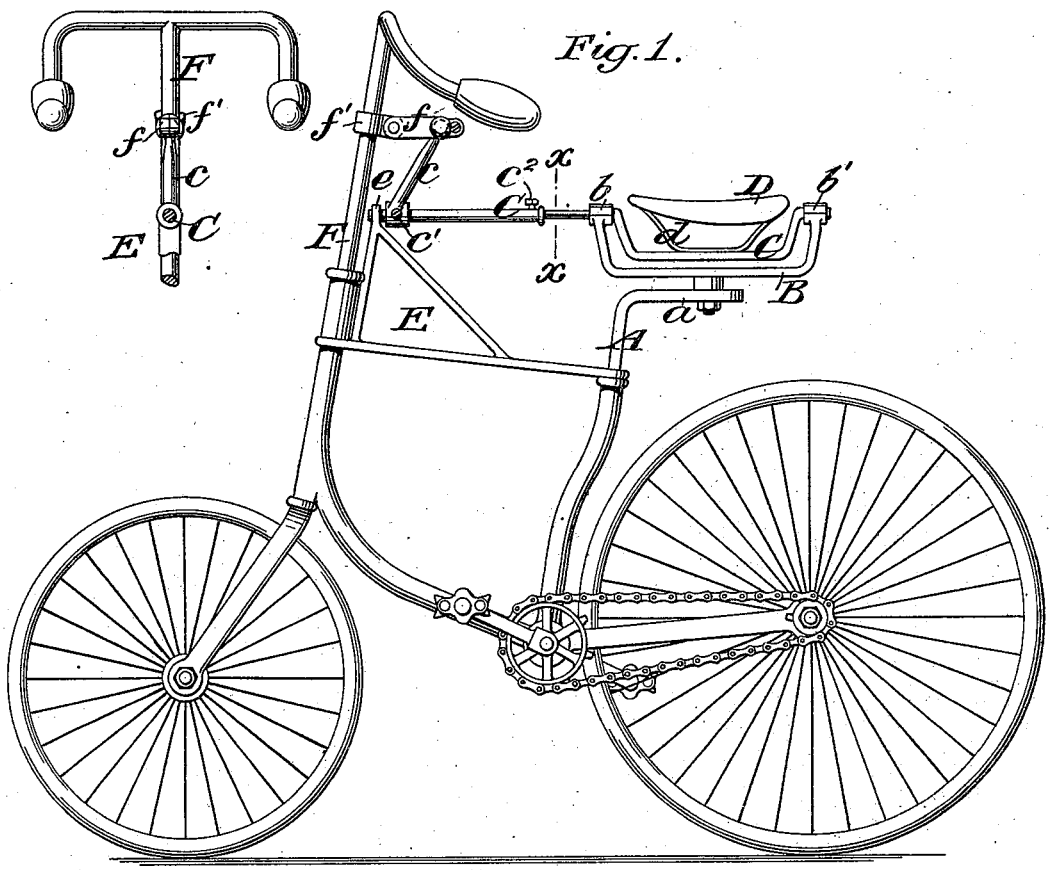
Witnesses:
C. E. Sundgren
Robert Macomber
Inventor:
Oscar Schmiedel
by attorneys
Brown & Seward

UNITED STATES PATENT OFFICE.

OSCAR SCHMIEDEL, OF BETHANY, WEST VIRGINIA.

BICYCLE.

SPECIFICATION forming part of Letters Patent No. 502,866, dated August 8, 1893.

Application filed September 22, 1892. Serial No. 446,545. (No model.)

*To all whom it may concern:*

Be it known that I, OSCAR SCHMIEDEL, of Bethany, in the county of Brooke and State of West Virginia, have invented a new and useful Improvement in Bicycles, of which the following is a specification.

My invention consists of the improved means hereinafter described and claimed whereby a bicycle of the "safety" type may be easily ridden and steered "hands off."

A practical embodiment of my invention is represented in the accompanying drawings in which—

Figure 1 is a side view of a bicycle having my invention applied thereto. Fig. 2 is a partial sectional view on the line $x, x$ of Fig. 1, looking toward the front of the bicycle, and Fig. 3 is a view of a modified form of a part of my invention.

A designates the saddle post of a bicycle which is adjustable as is usual. To its rearwardly bent portion $a$ is secured so as to be adjustable lengthwise of the bicycle, an elongated U-shaped supporting bar B. This bar is provided at its ends with bearings $b, b'$ in which is pivoted the saddle frame C which in the present instance is a swinging drop frame.

The spring $d$ of the saddle D is mounted on the drop frame C between the bearings $b, b'$ so that the plane of the saddle when occupied passes substantially through the axis of rotation of the drop frame. It will thus be seen that as the bicycle tips to one side or the other, the plane of the saddle stays substantially horizontal, the drop frame swinging in the bearings $b, b'$, thereby keeping the body of the rider in a vertical and natural position.

The arrangement for controlling the steering wheel by means of the swinging of the saddle frame is as follows: The drop frame C is extended forwardly from the bearing $b$ to within a short distance of the steering bar, when its end is pivoted to a suitable bearing $e$ on a frame E. This frame extends from the steering head of the bicycle to the saddle post and serves to strengthen the machine. The bearing $e$ is so constructed as to admit of the rear of the drop frame being adjusted vertically to suit riders of different heights. The rear portion of the drop frame C slides within the forward portion of the drop frame as the supporting bar B is adjusted forward or backward upon the part $a$ of the saddle post A. The two portions of the drop frame may be secured to rotate together preferably by means of a set screw $c^2$. An arm $c$ is adjustably secured to the forward part of the drop frame C by means of a set screw $c'$ and has a ball and socket connection at its upper end with a vertically swinging link $f$. This link is pivoted to a collar or clip $f'$ which is rigidly secured to the steering bar F.

If desired, instead of the above described connection between the drop frame and the steering bar, I may connect the two by suitable bevel gearings G, $g$, as shown in Fig. 3.

By the above arrangement the bicycle may easily be steered "hands off," as the steering wheel may be positively turned in the direction desired by tilting the bicycle toward the new direction to be traveled and thereby causing the drop frame upon which the saddle is located to depend from the bicycle frame on that side toward which it is tilted.

The operation is as follows: Let it be supposed that I wish to steer the bicycle to the left with my hands removed from the handle bar; I would place my weight upon my left pedal, which would incline the bicycle in that direction. As the bicycle tilts toward the left, the drop frame would still keep its vertical position and the saddle thereon its horizontal position, because of the pivotal connection between the drop frame and the supporting bar B, which supporting bar forms part of the bicycle frame. This tilting of the bicycle to the left will cause the steering wheel to turn to the left because of the connection between the drop frame and steering wheel by means of the arm $c$, link $f$, collar or clip $f'$ and steering bar F.

This simple and effective construction may be easily attached to the different styles of bicycles now in use and not only enables the rider to steer the bicycle positively with his hands off, but also adds to his ease and comfort, as it enables him to sit in an upright and graceful position upon the saddle.

It is evident that slight changes might be resorted to in the arrangement and construction of the several parts so as to attach them to the different styles of bicycles without departing from the spirit and scope of my invention, but

What I claim is—

1. In combination, a bicycle frame, a steering wheel, a laterally swinging saddle frame suspended from the bicycle frame and a connection between the steering wheel and the saddle frame, whereby the wheel is operated by the swinging of the said saddle frame, substantially as set forth.

2. In combination, a steering wheel, a steering bar connected therewith, a saddle, a laterally swinging drop frame upon which the saddle is secured, the drop frame being extended forwardly and having a connection with the steering bar, whereby, as the drop frame is swung it rotates the steering bar and thereby turns the steering wheel, substantially as set forth.

3. In combination, a steering wheel a saddle, a drop frame upon which the saddle is mounted, a supporting bar in which the drop frame is pivotally secured, the saddle being so mounted on the drop frame that its horizontal plane passes substantially through the axis of rotation of the drop frame, and a connection between the drop frame and the steering wheel whereby the latter is operated substantially as set forth.

4. In combination, a steering wheel, a steering bar connected therewith, a collar or clip rigidly secured to the steering bar and having a vertically swinging link pivoted thereto, a saddle post, a supporting bar secured thereto, a laterally swinging drop frame mounted in bearings in the supporting bar, the said drop frame extending forwardly toward the steering bar and an adjustable arm on the forward part of the drop frame having a ball and socket connection with the said vertically swinging link whereby as the drop frame is swung, the steering wheel is positively turned, substantially as set forth.

OSCAR SCHMIEDEL.

Witnesses:
 EUGENE FEUCHTINGER,
 B. T. BLAUPIED.